United States Patent

Mengshoel et al.

[11] Patent Number: 5,702,158
[45] Date of Patent: Dec. 30, 1997

[54] ARRANGEMENT IN STRUCTURAL ELEMENTS, FOR EXAMPLE FOR USE IN FURNITURE

[76] Inventors: Hans Chr. Mengshoel, Prinsesseallée 7, N-0275 Oslo; Oddvin Rykken, Sven Bruns gate 3, N-0166 Oslo, both of Norway

[21] Appl. No.: 615,260
[22] PCT Filed: Aug. 26, 1994
[86] PCT No.: PCT/NO94/00138
 § 371 Date: Aug. 19, 1996
 § 102(e) Date: Aug. 19, 1996
[87] PCT Pub. No.: WO95/07641
 PCT Pub. Date: Mar. 23, 1995

[30] Foreign Application Priority Data

Sep. 16, 1993 [NO] Norway .................. 93.3308

[51] Int. Cl.[6] .................. A47C 1/00; A47C 7/36
[52] U.S. Cl. .................. 297/445.1; 297/338; 297/353; 108/106; 108/107; 108/108
[58] Field of Search .................. 297/445.1, 440.13, 297/423.38, 338, 353, 451.4; 248/125.1, 245, 295.11, 297.21; 108/108, 107, 106; 211/193, 205, 207; 403/110, 256, 258, 260, 263, 373

[56] References Cited

U.S. PATENT DOCUMENTS

| | | | |
|---|---|---|---|
| 3,181,828 | 5/1965 | Cramer | 297/338 X |
| 4,109,961 | 8/1978 | Opsvik | 297/338 |
| 4,738,487 | 4/1988 | Shalinsky et al. | 297/338 |
| 4,793,654 | 12/1988 | Takafuji | 297/338 |
| 4,921,303 | 5/1990 | White | 297/338 |
| 4,930,839 | 6/1990 | Saito et al. | 297/338 |
| 5,511,855 | 4/1996 | Miles | 297/338 X |
| 5,547,253 | 8/1996 | Schwartz et al. | 297/338 |

Primary Examiner—Peter M. Cuomo
Assistant Examiner—Rodney B. White
Attorney, Agent, or Firm—Andrus, Sceales, Starke & Sawall

[57] ABSTRACT

An arrangement in a structural element, for example in connection with a piece of furniture, in particular seating furniture or occasional furniture, comprising at least one first and second supporting member, each comprising a section with a cut-out. The cut-outs are adapted to allow the supporting members to be inserted retrievably into each other for mutual interconnecting. The first supporting member comprises a centre stem having a substantially continuous open slit extending therethrough, the centre stem including substantially bevelled or partially curved or wavy sliding/locking surfaces. The second supporting member comprising continuously adjustable supporting members with bevelled or partially curved or wavy sliding/locking surfaces complementary to the bevelled or partially curved or wavy sliding/locking surfaces of the divided centre stem. The second supporting surface having a forward supporting element accessible from a front side of the arrangement and a rear locking element accessible from a rear side of the arrangement but communicating with the forward supporting element through the continuously open slit such that the bevelled or partially curved or wavy sliding/locking surfaces thereof engage the complementary bevelled or partially curved or wavy sliding/locking surfaces of the centre stem.

18 Claims, 6 Drawing Sheets

ARRANGEMENT IN STRUCTURAL ELEMENTS, FOR EXAMPLE FOR USE IN FURNITURE

BACKGROUND TO THE INVENTION

The present invention relates to an arrangement in a structural element, for example in connection with a piece of furniture, in particular seating furniture or occasional furniture, comprising at least one first and second supporting member, each comprising a part with a cut-out, the cut-outs being so adapted as to enable the supporting members to be inserted retrievably into each other for inter-connecting.

PRIOR ART

The present type of structural element is a further development of what is mentioned in Norwegian patent application 92.1285 in which reference is made to SE358 286 (Ward), GB 1.365.103 (Andrews), GB 1.421.535 (Finlator), GB 2.203.034 (Fraser). The further development is also described in international Patent Application No. PCT/NO93/00054.

Furthermore, known from FR patent specification 893 198 (Stoecklin) is a chair with an adjustable seat, the chair comprising a column which is at its forward edge fitted with a groove in which may slide a support which carries a seat. The groove in the column is, however, not through-going, and locking of the support and the seat is done by means of a screw inserted into one of several holes cut into the rear part of the column, while at the same time there is attached to the screw an arch encircling the rear edge of the column and from whose forward arch portions, springs extend which are connected to the support which carries the chair seat.

The known chair comprises no divided centre stem with chiefly inclined or partially curved or wavy sliding/locking surfaces entailing that the known chair cannot be used as a general structural element, in particular not of the type stated initially. Nor can the known chair be made as a self-supporting unit but only as a single-foot chair which is either placed in an iron trimmed tube fitted into the floor, or hung on a wall in an upper arch at the top of the chair column.

THE OBJECT OF THE INVENTION

The objects of the present invention are the same as those stated in Applicants' Norwegian patent application No. 92.1285, and international patent application No. PCT/NO93/00054, that is, to provide structural elements or supporting members which:

- may in a simple way which favours the user, form a base for one or several user surfaces which may be at different levels and form different mutual angles with each other.
- provide a particularly stable structure when ready mounted, the actual elements included in the supporting members both alone and together with the user surfaces used contributing to stabilizing the elements of the supporting members relative to each other,
- additionally provides a stable structure even if the elements included in the supporting members may be allowed to be yieldingly mounted,
- in their dismantled state require little storage and transport space, and when being mounted require no or very elementary tools, while at the same time the mounting is easily done,
- when used in connection with furniture, will easily fit into existing environments and combine with a number of furniture functions e.g. made into stools, chairs, chairs for kneeling-sitting, occasional tables, shelves, pedestals, small tables, long (refectory) tables etc.

BRIEF DESCRIPTION OF THE INVENTION

The objects stated above are achieved with an arrangement of the nature described initially which is according to the invention characterized through the attached patent claims.

Advantageous features and further developments of the present invention will be evident from the description which follows, together with the drawings attached.

BRIEF MENTION OF THE FIGURES

FIGS. 3 and 4 show in perspective on a larger scale a detail of the chair according to FIGS. 1 and 2 at the upper, rear area of the said chair, FIG. 3 being a perspective outline viewed somewhat at an angle from above, while FIG. 4 is a perspective outline viewed more directly from above.

DESCRIPTION OF EMBODIMENTS

Figure 1:
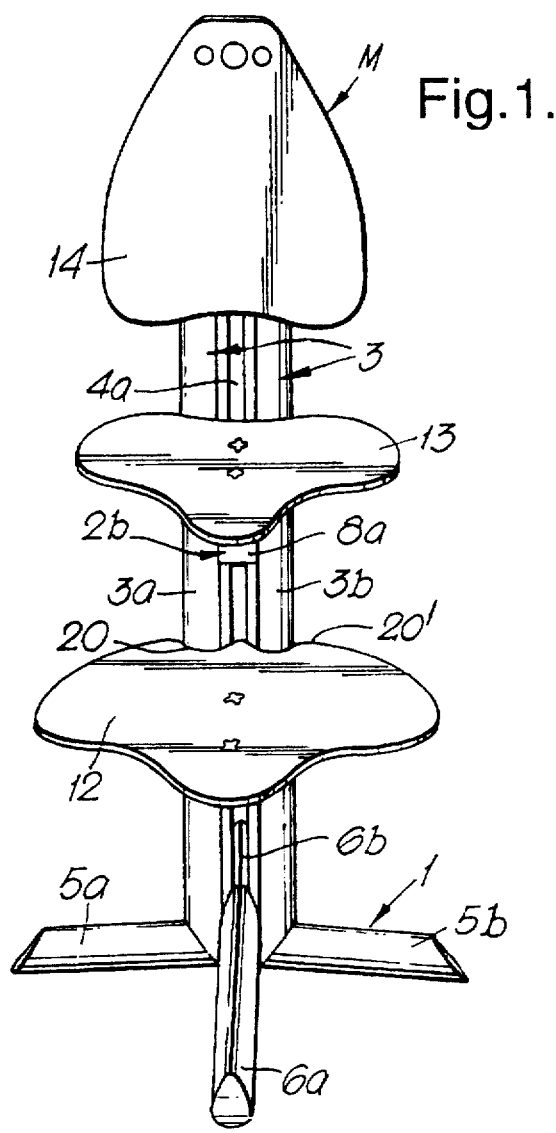
FIGS. 1 and 2 are, respectively, a perspective frontal sketch and perspective sideways sketch of a first embodiment of a chair whereby the present invention is realised.

It shall be understood that the present arrangement can be used in connection with structural elements in general, but because the principle of the present arrangement was developed specifically in connection with a piece of furniture, particularly seating furniture or occasional furniture, it will be referred to below as an arrangement which finds application in connection with a particular type of chair, without such a description limiting the invention.

The chair shown in FIGS. 1–6 builds on a principle which may be recognised from NO patent application No. 92.1285, the chair or furniture M itself comprising a first supporting member 1 comprising a divided centre stem 3 comprising two centre stem columns, 3a and 3b respectively, defining between them a cut-out or slit 4a, the said slit 4a being held substantially constant by means of suitable arresting devices arranged between the centre stem columns 3a, 3b e.g. in the form of guide pins, screws, bolts or such like as will be described below.

The supporting member 1 also comprises a lower pair of leg elements 5a, 5b protruding in opposite directions at the root of the respective centre stem columns, 3a and 3b, respectively.

Figure 2:
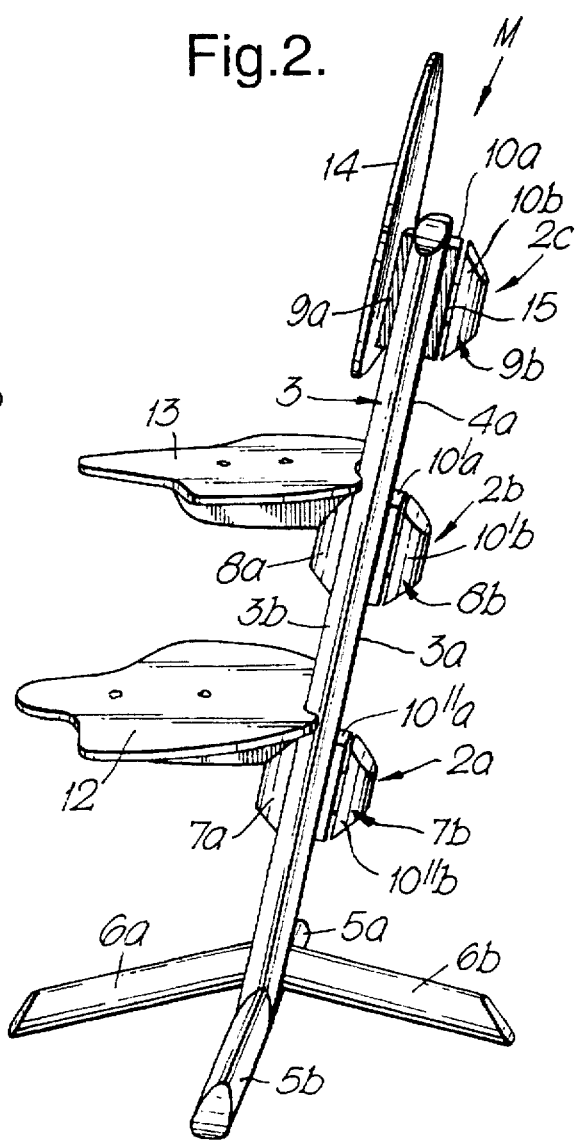
Figure 3:
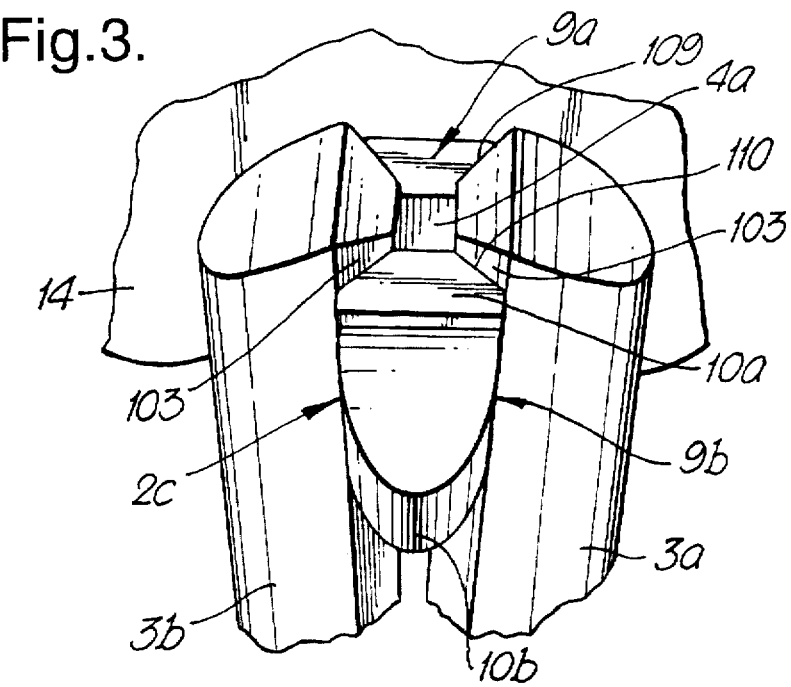

As will be particularly evident from FIGS. 3–6, the centre stem columns 3a and 3b have been made with slanting surfaces 103 at the areas facing the centre stem slit 4a, and because of these slanting surfaces 103, it is possible to insert in a simple manner into the slit 4a continuously adjustable supporting members 2a, 2b, 2c, see in particular FIG. 2, the said continuously adjustable supporting members in turn being capable of supporting various surfaces or furniture parts which may be utilized by the user of the chair.

In FIGS. 1–6, and in particular in FIG. 2, is shown a first lower supporting member 2a comprising two supporting elements 7a, 7b continuously mountable into the said centre stem slit 4a and in this case supporting a foot rest 12.

Furthermore, particularly in FIG. 2 is shown a second additional supporting member 2b comprising the supporting elements 8a and 8b, continuously mounted in the said centre stem slit 4a and in this case supporting a seat section 13.

Finally, also shown in FIG. 2 is an upper third supporting member 2c, comprising supporting elements 9a and 9b, also continuously mountable in the said centre stem slit 4a, while at the same time the supporting member 2c carries a back rest section With reference specifically to FIGS. 2–6 it is evident that the last mentioned supporting member 2c comprises the forward supporting element 9a supporting the back rest section 14, and the rear supporting element 9b comprising in turn a movable wedge section 10a being secured to the forward supporting element 9a via for example a threaded bolt 11, as well as a rotatable section 10b capable through rotation of the said threaded bolt 11, of making the wedge shaped section 10a interlock more tightly or less with the corresponding slanting surfaces 103 of the previously mentioned centre stem columns 3a and 3b. It should be understood that both the supporting element 9a and the movable wedge section 10b comprise slanting surfaces, 109 and 110 respectively, corresponding to the said slanting surfaces 103 of the centre stem columns 3a, 3b.

Between the said wedge shaped section 10a and the rotatable tightening part 10b there may suitably be arranged a yielding body 15 contributing towards firm and sound tightening of the supporting member 2c being, by means of the said items 9a, 10a and 10b in its loosened state capable of continuous adjustment upwards or downwards along the centre stem column 4a in order thus to be able to move the back rest section 14 secured to the supporting member 2c, to any suitable position of height.

It should be understood that the intermediate supporting member 2b, comprising the forward supporting element 8a, which carries the chair seat section 13, has a rear supporting element 8b comprising, similarly to the rear supporting element 9b mentioned above, a wedge shaped section 10'a and a rotatable tightener part 10'b of the same function as the above mentioned parts 10a and 10b relative to the supporting member 2c.

Correspondingly, there is a lower supporting member 2a carrying the foot rest 12, executed with the rear supporting element 7b, comprising a wedge shaped part 10"a and a rotatable tightener part 10"b.

At its very root the divided centre stem 3 comprising the centre stem columns 3a and 3b has been mounted or fitted with a pair of leg elements 6a, 6b in order thus together with the lower pairs 5a and 5b of leg elements for the centre column 3 to form a stable foot cross for the actual piece of furniture M.

Figure 4:
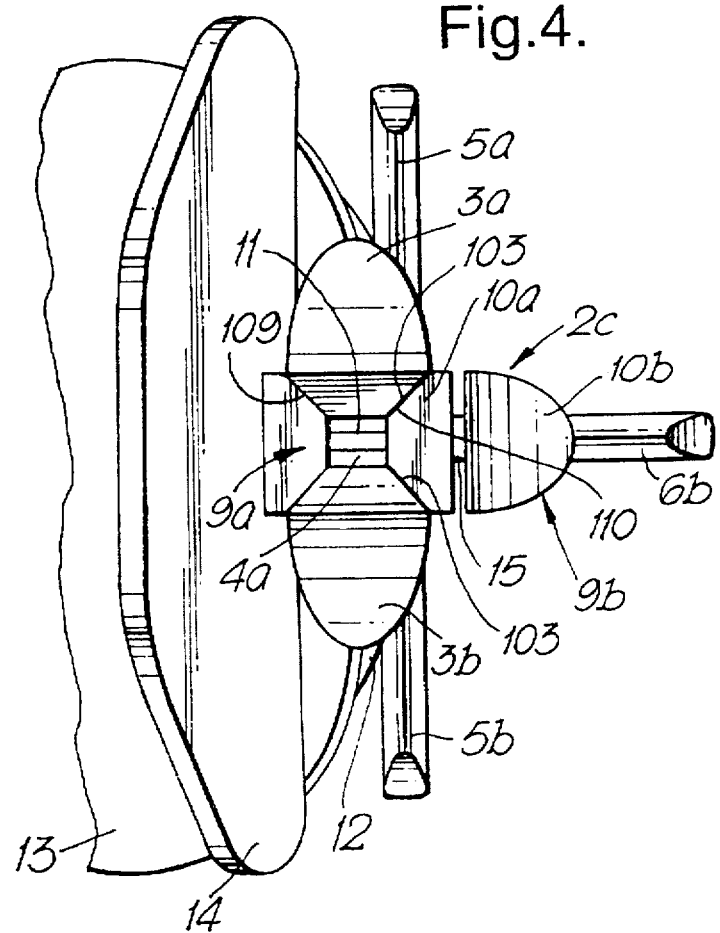
Figure 5:
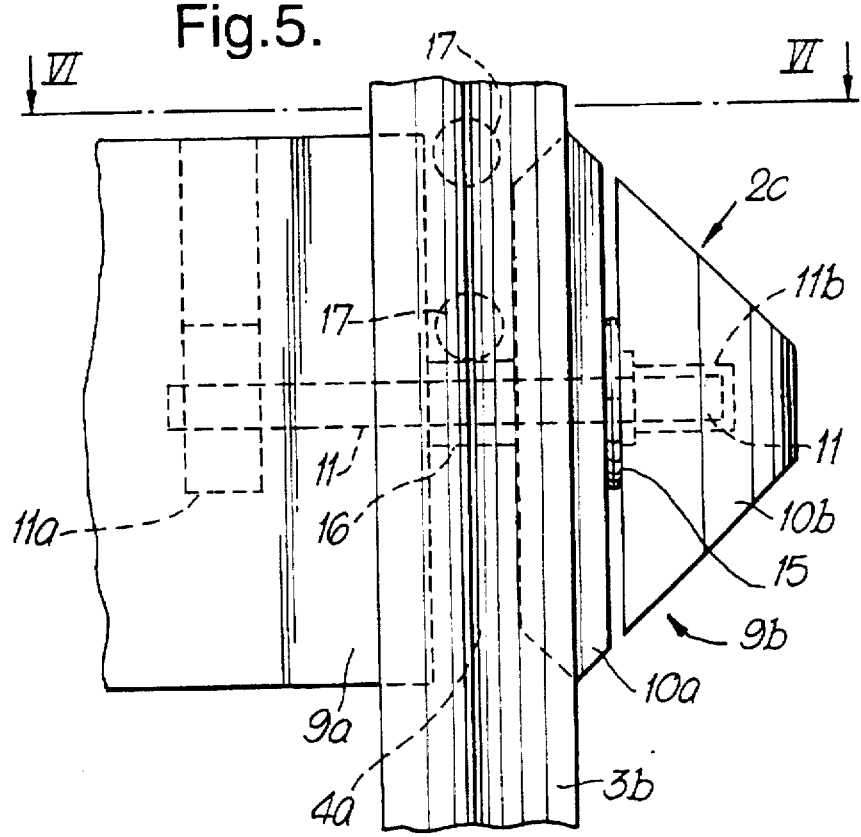
FIG. 5 is a sideways sketch of the area shown in FIGS. 3 and 4 of the said chair, but comprise additional details, especially with regard to fastening and locking devices.
Figure 6:
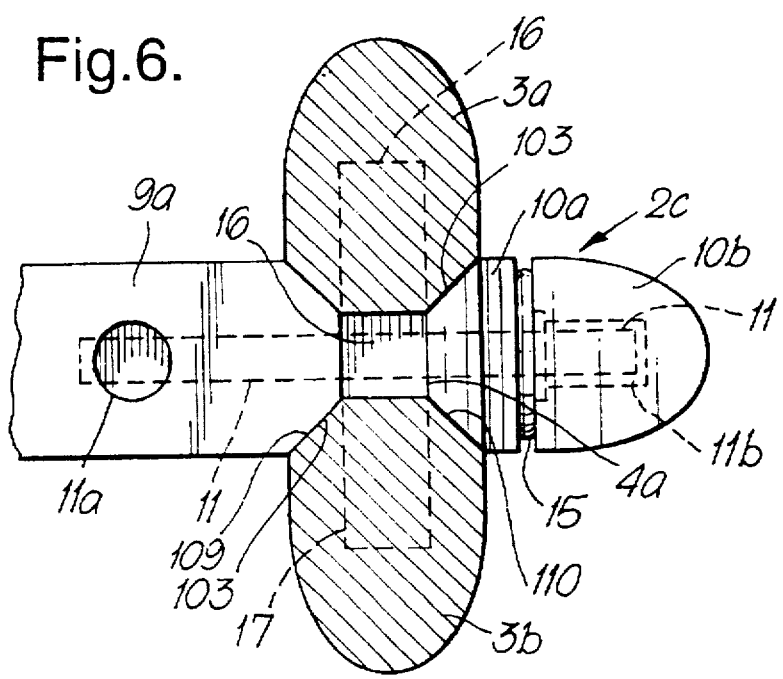
FIG. 6 is a section along the line VI—VI in FIG. 5.

In FIGS. 5 and 6 which show on a larger scale how one of the supporting members, in this case the supporting member 2c, is constructed, the forward supporting element 9a is reidentified capable for instance of supporting the back rest section 14, and the rear supporting element 9b comprising the movable wedge section 10a which is in turn secured to the forward supporting element 9a by means of the threaded bolt 11 shown schematically also in FIG. 4. The bolt 11 extends from a holding piece 11a, e.g. a traverse nut, arranged in the forward supporting element 9a and backwards through the said forward supporting element 9a and through the slit 4a between the said centre stem columns 3a and 3b, through the said wedge section 10a and into the rotatable part 10b, and hence also through the yielding member 15 arranged between the wedge section 10a and the rotatable tightener part 10b.

Inserted into the rotatable tightener part 10b is a threaded sleeve 11b which on being rotated clockwise, will rotate on to the threaded bolt 11 and thus force the wedge part 10a into the slit 4a between the centre stem columns 3a, 3b while at the same time also the forward supporting element 9a with its slanting surfaces 103 will be forced correspondingly into the said slit 4a between the centre stem columns 3a and 3b.

To achieve suitable control over the threaded bolt 11 there is on the actual bolt in the region of the slit 4a, arranged a bushing 16, e.g. of nylon, arranged with suitable margins between the actual surfaces in the slit itself 4a. To maintain the two centre stem columns 3a and 3b at equidistance and thus an even centre stem slit 4a, at appropriate levels in the slit 4a holding devices are arranged to hold together the said centre stem columns 3a, 3b, executed here e.g. as glued wooden pegs 17.

In order further to stabilize the divided centre stem the foot rest section and/or the seat section may be designed with cut-outs in the area of the centre stem columns 3a and 3b, enabling these cut-outs, for example as shown at reference numeral 20 in FIG. 1, to encircle the said centre stem columns 3a and 3b to a greater or smaller extent. In particular in the embodiment shown in FIG. 1, the cut-out 20 forms a wavy profile where the outer edges of the cut-out 20' embraces parts of the centre stem columns 3a and 3b which are opposite to the slit 4a in between, and this contributes towards the slit 4b maintaining a substantially constant width, even if the said tightener elements are pressed hard into the slit 4a during securing of the said continuously adjustable supporting members 2a, 2b, 2c.

Figure 7:
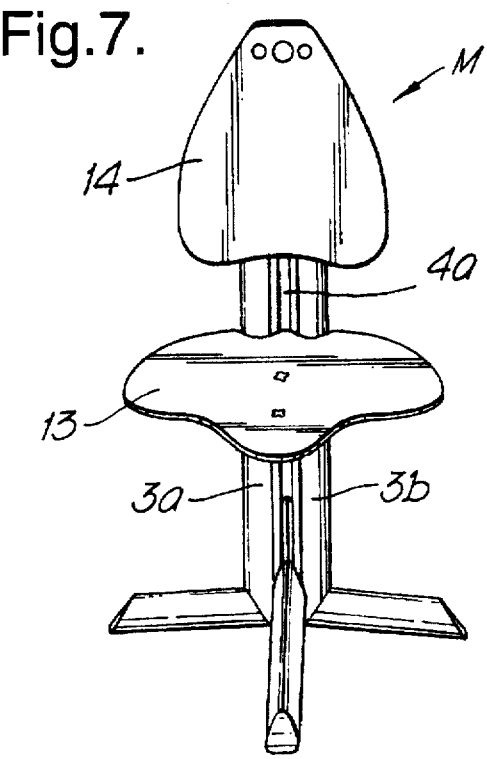
FIG. 7 is a variant of the chair according to FIGS. 1 and 2, the foot rest having here been removed, and the back rest and the seat portion adjusted to low positions.
Figure 8:
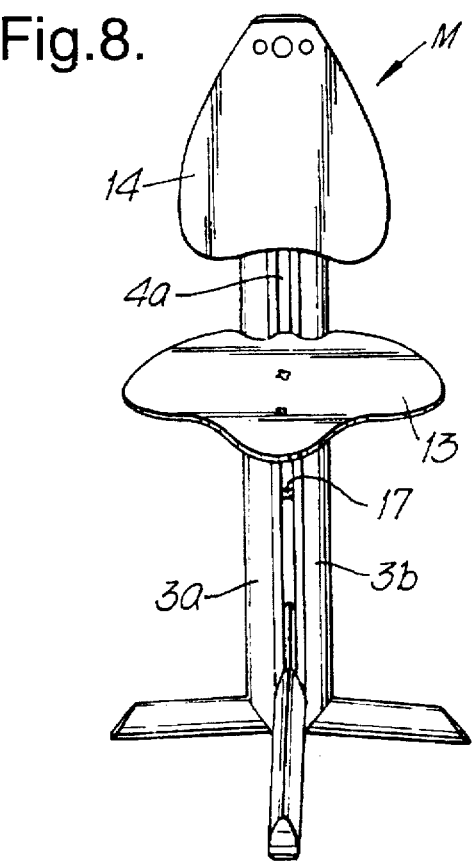
FIG. 8 is a perspective sketch, similar to FIG. 7, showing the same chair with a higher adjustment of the position both of the back rest and the seat portion.

In FIGS. 7 and 8 is shown a chair M corresponding to the one previously mentioned, but here with the foot rest section removed, but with the back rest section 14 and the seat section 13 shown in various positions along the previously mentioned centre stem slit 4a lying between the centre stem columns 3a and 3b.

Figure 9:
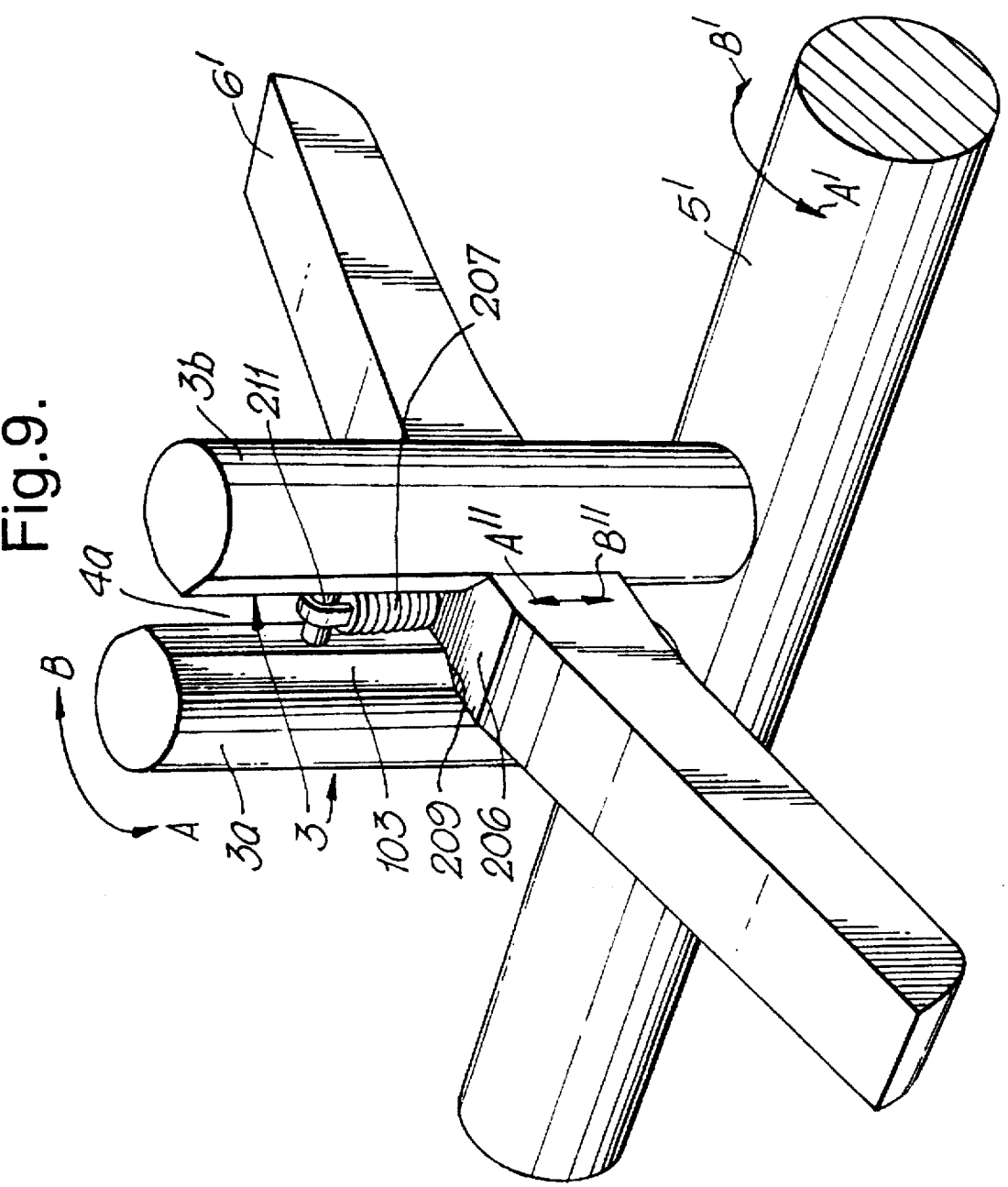
FIG. 9 is a perspective sketch of a lower section of an additional embodiment of the invention.

In FIG. 9, showing in perspective a lower section of a further embodiment of the invention, is reidentified the divided centre stem 3 comprising two centre stem columns, 3a and 3b respectively, defining between them the cut-out or the slit 4a.

In the present case, the centre stem columns 3a and 3b are inserted into a lower common transverse leg 5' having been made with a completely or partly round surface to allow rolling on the floor, while at the same time the leg 5' extends across the centre stem columns 3a and 3b.

At the root of the divided centre stem 3 comprising the centre stem columns 3a and 3b, a cross leg 6' is fitted, resembling a boomerang, the said cross leg 6' together with the previously mentioned leg 5' forming a foot cross for the actual assembled structure or piece of furniture concerned.

Nevertheless, the transverse leg 5' and the cross leg 6' do not in the present instance form a stable foot cross, but a foot cross which permits a certain rocking movement or swinging movement of the centre stem 3 relative to the base on which the structure is placed.

This rocking movement can be procured because the cross leg 6' is yieldingly mounted in the slit 4a between the centre stem columns 3a and 3b, the cross leg 6' being made with a middle section 206 comprising slanting surfaces 209 which in turn correspond to the slanting surfaces 103 made on the respective centre stem columns 3a and 3b.

At its middle section 206, the cross leg 6' has moreover been made with a yielding body 207 fastened at its top to a peg 211 placed in the slit 4a between the centre stem columns 3a and 3b, and preferably prestressed in the direction towards the base or the floor.

If the centre stem 3 is affected in the direction of the arrow A in FIG. 1, the cross leg 5' will rotate in the direction of arrow A' while at the same time the cross leg 6' will be able to move somewhat upwards along the centre slit 4a between the centre stem columns 3a and 3b in the direction of the arrow A" until the elastic body 207 becomes so compressed as to physically preclude any further inclination of the centre stem 3 in the direction of arrow A. Depending on the play between the slanting or curved surfaces 103 on the centre stem 3 and the slanting or curved surfaces 209 on the cross leg 6', as well as the prestressing in the elastic body 207, the cross leg 6' will also perform a gliding movement along the floor, possibly a somewhat see-sawing movement relative to the floor.

Similarly, if the centre stem 3 is affected to make it tip in the direction of arrow B, the cross leg 5' will be rotated in the direction of arrow B' entailing in turn that the cross leg 6' will be able to be lifted a corresponding distance upwards along the centre slit 4a between the centre stem columns 3a and 3b.

In opposite movements towards the neutral position shown in FIG. 9, the cross leg 6' will correspondingly, after having been moved in the direction of arrow A", move in the direction of arrow B" until possible further contact against the base on which the structure rests.

It should be understood that a similar principle of yielding mounting can be used not only in the lower pat of a structural element in the manner mentioned in connection with FIG. 9, but also generally for any supporting member comprising continuously adjustable supporting members relative to a divided centre stem.

It can thus be understood that the supporting members mentioned in connection with FIGS. 1–6, in particular the supporting members 2a and 2b, carrying respectively a foot rest 12, a seat section 13, may comprise yielding bodies so designed as to allow the foot rest 12 and/or the seat section 13 to swing up and down in the slit between the centre stem columns within certain suitable limits, i.e. still remain continuously adjustable relative to the divided centre stem with slanting or partially curved sliding/locking surfaces.

Figure 10:
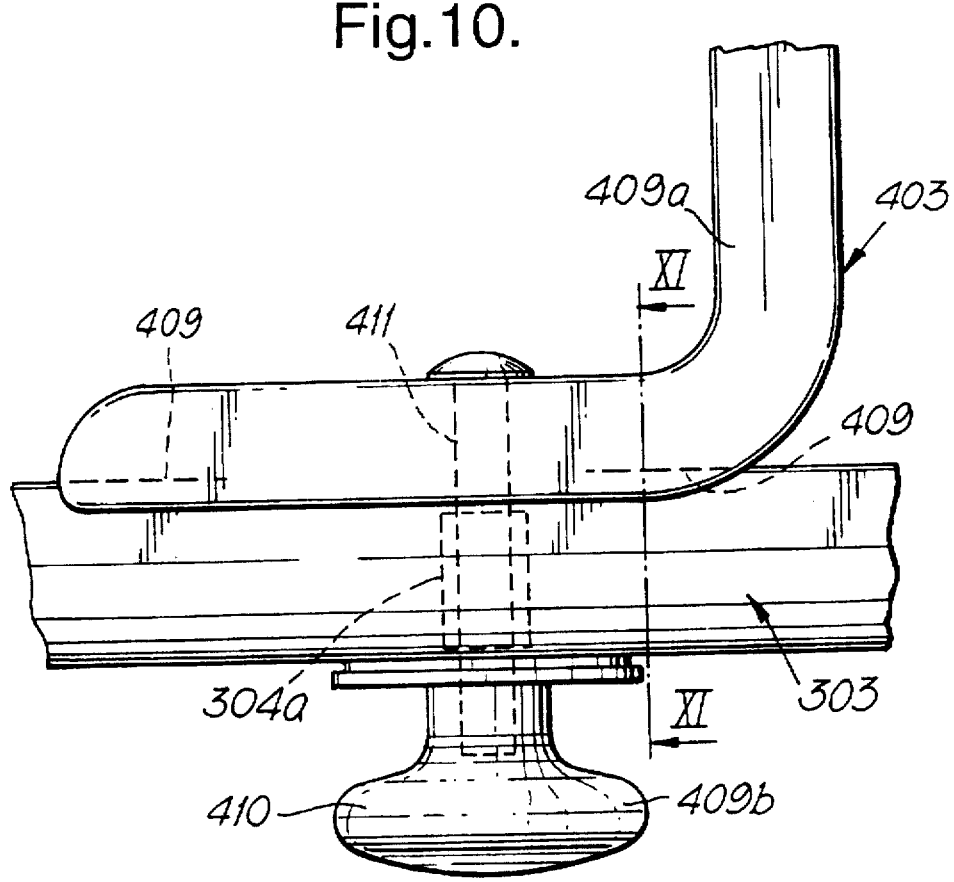
FIG. 10 is a sideways sketch of a variant of the insertion and locking devices according to the invention.
Figure 11:
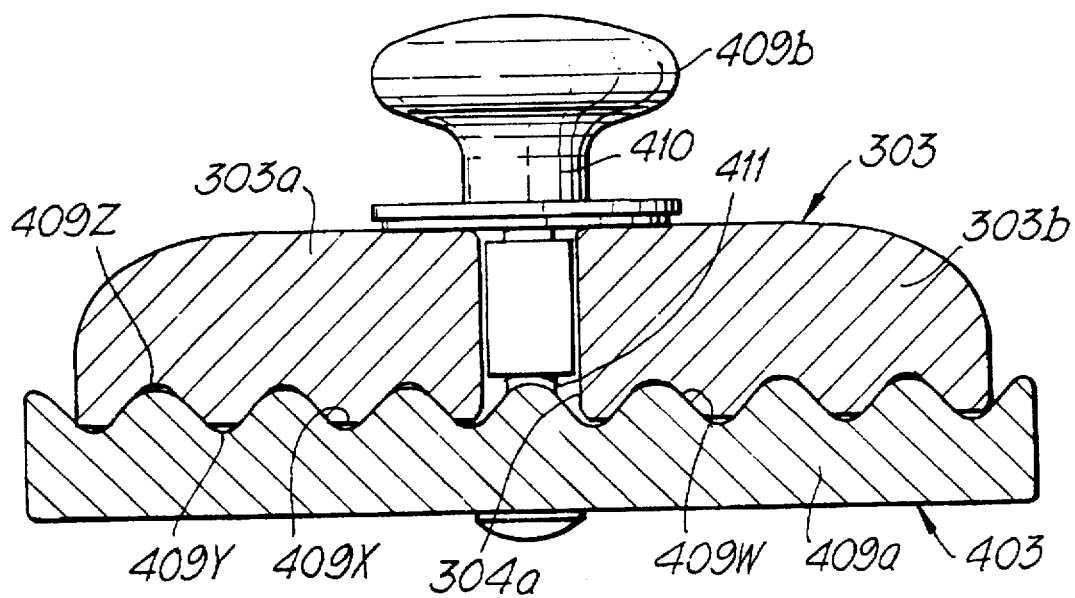
FIG. 11 is a section along the line XI—XI in FIG. 10.

In FIGS. 10 and 11 is shown a variant of the fastening of the locking devices, the first supporting member, in this case the centre stem 303, having a cut-out or a slit 304a or being made up of two centre stem columns, 303a and 303b respectively, along whole or part of its extent, but here made with wave-shaped locking surfaces 409X which engage with corresponding wave-shaped locking surfaces 409Y on a second adjustable supporting member. The adjustable supporting member 403 comprises a forward supporting element 409a which has the said wavy locking surfaces 409, and a rear supporting element 409b having a rotatable wheel 410 attached to a bolt 411 protruding through the slit 304a and into the forward supporting element 409a for mutual tightening or loosening of the elements 409a and 409b.

In the embodiment shown in FIGS. 10 and 11, the second adjustable supporting member 403 could be a supporting member as such, with e.g. a seat board or a foot board or similar board for use in furniture or the like.

The wavy areas 409X and 409Y may be made so that the waves have areas which join along slanting wave surfaces 409W while the troughs and crests of the waves may have a margin relative to each other, see the spaces 409Z in FIG. 11.

Special features of this design may be summarised as follows:

a) a centre stem which is divided or has a slit, wit substantially slanting or partially curving or wavy sliding/locking surfaces, b) supporting members with sliding/locking surfaces, slanting or partially curved or wavy relative to the centre stem being divided or having a slit, c) locking pieces/sliding pieces of identical design to parts or sections of the divided centre stem, d) more or less encircling user surfaces which support the slit between the two parallel centre stem columns, e) wave shaped sliding/locking surfaces providing better control and larger contact surfaces for locking, while also keeping the slit or the centre column cut-out from splitting f) yielding mounting of supporting members, permitting limited or controlled movement relative to the centre stem, g) simple mounting of back rest, seat and foot rest, without special tools, h) great possibilities for variations in furniture design, comprising chairs, pedestals, book-cases, small tables, long (refectory) tables etc., all made in one overall design which is readily adaptable to existing living environments or office environments, i) the same solution may be utilized in structural elements comprising two or more columns extending upwards, e.g. two, four or six upwards extending columns whereby the locking mechanism will then need to be adapted to the space available between adjoining columns.

We claim:

1. An arrangement in structural elements comprising at least a first and second supporting member (1, 2a, 2b, 2c) each comprising a section (3a, 3b, 9a, 9b) with a cut-out (4a, 4a), the cut-outs being adapted so as to allow the supporting members (1, 2a, 2b, 2c) to be inserted retrievably into each other for mutual interconnection, characterized in that the first supporting member (1) comprises a centre stem (3) having a substantially continuous open slit (4a) extending therethrough, the centre stem further including substantially bevelled or partially curved or wavy sliding/locking surfaces (103), and that the second supporting member (2a, 2b, 2c) comprises continuously adjustable supporting members with bevelled or partially curved or wavy sliding/locking surfaces (109, 110) complementary to the bevelled or partially curved or wavy sliding/locking surfaces (103) of the centre stem (3), said second supporting members comprising a forward supporting element accessible from a front side of said arrangement and a rear locking element accessible from a rear side of said arrangement but communicating with said forward supporting element through said continuously open slit such that said bevelled or partially curved or wavy sliding/locking surfaces (103) thereof engage said complementary bevelled or partially curved or wavy sliding/locking surfaces of the centre stem.

2. An arrangement as stated in claim 1, characterized in that the centre stem is defined by first and second columns (3a,3b) having the continuously open slit therebetween and in that the second supporting member (2a, 2b, 2c) carries a user surface (12) the user surface including one or several cut-outs (20) partially encircling the centre stem columns (3a, 3b).

3. An arrangement as stated in claim 2, characterized in that the cut-outs (20) in the user surface (12) are defined by outer edges (20') which have a wave-shaped profile, the outer edges (20') of the cut-outs (20) embracing the centre stem columns (3a, 3b) at a location facing away from the continuously open slit (4).

4. An arrangement as stated in claim 1, characterized in that a third continuously adjustable supporting member (6') comprises yielding bodies (207) which allow controlled movement relative to the centre stem (3).

5. An arrangement in structural elements comprising at least a first and second supporting member (1, 2a, 2b, 2c) each comprising a section (3a, 3b, 9a, 9b) with a cut-out (4a, 4a), the cut-outs being adapted so as to allow the supporting members (1, 2a, 2b, 2c) to be inserted retrievably into each other for mutual interconnection, characterized in that the first supporting member (1) comprises a centre stem (3) having a substantially continuous open slit (4a) extending therethrough, the centre stem further including substantially bevelled or partially curved or wavy sliding/locking surfaces (103), and that the second supporting member (2a, 2b, 2c) comprises continuously adjustable supporting members with bevelled or partially curved or wavy sliding/locking surfaces (109, 110) complementary to the bevelled or partially curved or wavy sliding/locking surfaces (103) of the centre stem (3), said supporting members comprising a forward supporting element accessible from a front side of said arrangement and a rear locking element accessible from a rear side of said arrangement and communicating with said forward supporting element through said continuously open slit such that said bevelled or partially curved or wavy sliding/locking surfaces (103) thereof engage said complementary bevelled or partially curved or wavy sliding/locking surfaces of the centre stem, the second supporting member (2a, 2b, 2c) further comprising a forward supporting element (9a) arranged so as to carry a user surface (14), and a movable wedge section (10a) being secured to the forward supporting element (9a), and a rotatable section (10b) serving as a tightening device for the wedge section (10a).

6. An arrangement as stated in claim 5, characterized in that the moveable wedge section (10a) is secured to the forward supporting element (9a) via e.g. a threaded bolt (11), the said threaded bolt (11) extending through the wedge section (10a) and into the rotatable section (10b), an elastic yielding body (15) being arranged between the wedge shaped section (10a) and the rotatable section (10b).

7. An arrangement as stated in claim 5, characterized in that the centre stem is defined by first and second columns (3a, 3b) having the continuously open slit therebetween, the second supporting member (2a, 2b, 2c) carries a user surface (12), the user surface including one or several cut-outs (20) partially encircling the centre stem columns (3a, 3b).

8. An arrangement as stated in claim 7, characterized in that the cut-outs (20) in the user surface (12) are defined by outer edges (20') which have a wave-shaped profile, the outer edges (20') of the cut-outs (20) embracing the centre stem columns (3a, 3b) at a location facing away from the continuously open slit (4).

9. An arrangement as stated in claim 5, characterized in that the centre stem (3) is defined by first and second columns (3a, 3b), the columns being held together by suitable distance pieces (17), so as to form several continuous cut-outs (4a) therebetween for insertion of the said second supporting member (2a, 2b, 2c).

10. An arrangement as stated in claim 5, characterized in that the arrangement comprises two or several first supporting members (1) each of which is provided with a divided centre stem defining a centre stem slit, and each of the supporting members (1) comprising a pair of centre stem columns having an angular spacing of 60° or less relative to an adjacent pair of columns, as well as one or several second supporting members (2a, 2b, 2c) being continuously movable and lockable in the centre stem slits arranged between any pair of centre stem columns.

11. An arrangement in structural elements comprising at least a first and second supporting member (1, 2a, 2b, 2c) each comprising a section (3a, 3b, 9a, 9b) with a cut-out (4a, 4a), the cut-outs being adapted so as to allow the supporting members (1, 2a, 2b, 2c) to be inserted retrievably into each other for mutual interconnection, characterized in that the first supporting member (1) comprises a centre stem (3) defined by first and second columns (3a, 3b), the columns being held together by suitable distance pieces (17), e.g. guide pegs so as to form several continuous cut-outs (4a) therebetween for insertion of the said second supporting member (2a, 2b, 2c) and having a substantially continuous open slit (4a) extending therethrough, the centre stem further including substantially bevelled or partially curved or wavy sliding/locking surfaces (103), and that the second supporting member (2a, 2b, 2c) comprises continuously adjustable supporting members with bevelled or partially curved or wavy sliding/locking surfaces (109, 110) complementary to the bevelled or partially curved or wavy sliding/locking surfaces (103) of the centre stem (3), said supporting members comprising a forward supporting element accessible from a front side of said arrangement and a rear locking element accessible from a rear side of said arrangement but communicating with said forward supporting element through said continuously open slit such that said bevelled or partially curved or wavy sliding/locking surfaces (103) thereof engage said complementary bevelled or partially curved or wavy sliding/locking surfaces of the centre stem.

12. An arrangement in structural elements comprising at least a first and second supporting member (1, 2a, 2b, 2c) each comprising a section (3a, 3b, 9a, 9b) with a cut-out (4a, 4a), the cut-outs being adapted so as to allow the supporting members (1, 2a, 2b, 2c) to be inserted retrievably into each other for mutual interconnection, characterized in that the first supporting member (1) comprises a centre stem (3) having a substantially continuous open slit (4a) extending therethrough, the centre stem further including substantially bevelled or partially curved or wavy sliding/locking surfaces (103), and that the second supporting member (2a, 2b, 2c) comprises continuously adjustable supporting members with bevelled or partially curved or wavy sliding/locking surfaces (109, 110) complementary to the bevelled or partially curved or wavy sliding/locking surfaces (103) of the centre stem (3), said supporting members comprising a forward supporting element accessible from a front side of said arrangement and a rear locking element accessible from a rear side of said arrangement but communicating with said forward supporting element through said continuously open slit such that said bevelled or partially curved or wavy sliding/locking surfaces (103) thereof engage said complementary bevelled or partially curved or wavy sliding/locking surfaces of the centre stem, wherein the arrangement further comprises one or several additional first supporting members (1) each of which provided with a divided centre stem defining a centre slit, and each of the additional first supporting members (1)

comprising a pair of centre stem columns having an angular spacing of 60° or less relative to an adjacent pair of columns, and one or several additional second supporting members (2a, 2b, 2c) being continuously movable and lockable in the centre stem slits arranged between any pair of centre stem columns.

13. An arrangement in structural elements comprising at least a first and second supporting member (1, 2a, 2b, 2c) each comprising a section (3a, 3b, 9a, 9b) with a cut-out (4a, 4a), the cut-outs being adapted so as to allow the supporting members (1, 2a, 2b, 2c) to be inserted retrievably into each other for mutual interconnection, characterized in that the first supporting member (1) comprises a generally vertically extending centre stem (3) having a substantially continuous open slit (4a) extending therethrough, the centre stem further including substantially bevelled or partially curved or wavy sliding/locking surfaces (103), the first support member further including a lower pair of leg elements (5a, 5b) protruding in opposite directions at a lower part of the centre stem, and a pair of leg elements (6a, 6b) forming, together with the said lower pair of leg elements (5a, 5b) a stable self-supporting foot cross, and that the second supporting member (2a, 2b, 2c) comprises continuously adjustable supporting members with bevelled or partially curved or wavy sliding/locking surfaces (109, 110) complementary to the bevelled or partially curved or wavy sliding/locking surfaces (103) of the centre stem (3), said supporting members comprising a forward supporting element accessible from a front side of said arrangement and a rear locking element accessible from a rear side of said arrangement and communicating with said forward supporting element through said continuously open slit such that said bevelled or partially curved or wavy sliding/locking surfaces (103) thereof engage said complementary bevelled or partially curved or wavy sliding/locking surfaces of the centre stem.

14. An arrangement in structural elements comprising at least a first, and second supporting member (1, 2a, 2b, 2c), each comprising a section (3a, 3b, 9a, 9b) with a cut-out (4a, 4a), the cut-outs being adapted so as to allow the supporting members (1, 2a, 2b, 2c) to be inserted retrievably into each other for mutual interconnection, and a third continuously adjustable support member, the arrangement (6') characterized in that the first supporting member (1) comprises a centre stem (3) having a substantially continuous open slit (4a) extending therethrough, the centre stem further including substantially bevelled or partially curved or wavy sliding/locking surfaces (103), and that the second supporting member (2a, 2b, 2c) comprises continuously adjustable supporting members with bevelled or partially curved or wavy sliding/locking surfaces (109, 110) complementary to the bevelled or partially curved or wavy sliding/locking surfaces (103) of the centre stem (3), said supporting members comprising a forward supporting element accessible from a front side of said arrangement and a rear locking element accessible from a rear side of said arrangement and communicating with said forward supporting element through said continuously open slit such that said bevelled or partially curved or wavy sliding/locking surfaces (103) thereof engage said complementary bevelled or partially curved or wavy sliding/locking surfaces of the centre stem, and wherein a third continuously adjustable supporting member (6') comprises yielding bodies (207) which allow controlled movement relative to the centre stem (3), wherein the third supporting member (6') is executed as a cross leg crossing the continuously open slit (4a) of the centre stem (3) and being at its middle area (206) made with slanting or curving surfaces (209) corresponding to the slanting or partially curved sliding/locking surfaces (103) of the centre stem (3), and also comprises yielding bodies (207).

15. An arrangement as stated in claim 14, characterized in that the yielding bodies (207) prestress the cross leg (6') against a base underneath the structural element or chair but permit movement (A", B") controlled against a counterforce, of the cross leg (6') in the continuously open slit at different angular positions of the centre stem (3), in particular when the latter has a lower transverse leg (5') supporting the centre stem (3) and permitting rolling (A', B').

16. An arrangement in structural elements comprising at least a first and second supporting member (1, 2a, 2b, 2c) each comprising a section (3a, 3b, 9a, 9b) with a cut-out (4a, 4a), the cut-outs being adapted so as to allow the supporting members (1, 2a, 2b, 2c) to be inserted retrievably into each other for mutual interconnection, characterized in that the first supporting member (1) comprises a centre stem (3) having a substantially continuous open slit (4a) extending therethrough, the centre stem further including substantially bevelled or partially curved or wavy sliding/locking surfaces (103), and that the second supporting member (2a, 2b, 2c) comprises continuously adjustable supporting members with bevelled or partially curved or wavy sliding/locking surfaces (109, 110) complementary to the bevelled or partially curved or wavy sliding/locking surfaces (103) of the centre stem (3), said supporting members comprising a forward supporting element accessible from a front side of said arrangement and a rear locking element accessible from a rear side of said arrangement and communicating with said forward supporting element through said continuously open slit such that said bevelled or partially curved or wavy sliding/locking surfaces (103) thereof engage said complementary bevelled or partially curved or wavy sliding/locking surfaces of the centre stem, and wherein the first supporting member (303) has wave-shaped locking and guiding surfaces (409X) which engage into corresponding wave-shaped locking and guiding surfaces of a second adjustable supporting member (403).

17. An arrangement as stated in claim 16, characterized in that the wave-shaped locking and guiding surfaces (409X, 409Y) comprise straight slanting engagement areas (409W) allowing for top and bottom spaces (409X, 409Y).

18. A furniture arrangement, comprising:
a base engageable with a supporting surface;
a support member extending from the base, wherein the support member includes a substantially continuous slit extending throughout at least a portion of the length of the support member, wherein the support member defines a pair of oppositely facing sides onto which the slit opens;
a user surface;
a first user surface supporting member to which the user surface is connected; and
a second user surface supporting member engaged with the first user surface supporting member through the slit, wherein the first user surface supporting member engages the support member adjacent a first one of the support member sides and the second user surface supporting member engages the support member adjacent a second one of the support member sides for supporting the user surface in a desired position on the support member.

* * * * *

UNITED STATES PATENT AND TRADEMARK OFFICE
CERTIFICATE OF CORRECTION

PATENT NO. : 5,702,158
DATED : December 30, 1997
INVENTOR(S) : HANS CHR. MENGSHOEL It is certified that error appears in the above-indentified patent and that said Letters Patent is hereby corrected as shown below:

<u>In The Claims</u>

Claim 2, column 7, line 3, after "(12)" insert -- , --; Claim 6, column 7, line 47, delete "e.g."; Claim 6, column 7, line 49, delete "section" and substitute therefor -- part --; Claim 6, column 7, line 51, delete "section" and substitute therefor -- part --; Claim 11, column 8, lines 21-22, delete "e.g. guide pegs"; Claim 14, column 9, line 61, delete "wherein a" and substitute therefor -- that the --; Claim 14, column 9, line 63, after "(3)," delete "wherein".

Signed and Sealed this

Fourteenth Day of July, 1998

*Attest:*

BRUCE LEHMAN

*Attesting Officer*    *Commissioner of Patents and Trademarks*